Aug. 15, 1933.  A. A. BYERLEIN  1,922,355

SHAFT BEARING

Filed July 18, 1931

Inventor
Arthur A Byerlein
By Maréchal & Noe
Attorney

Patented Aug. 15, 1933

1,922,355

UNITED STATES PATENT OFFICE 1,922,355

SHAFT BEARING

Arthur A. Byerlein, Detroit, Mich., assignor to General Machinery Corporation, Hamilton, Ohio, a Corporation of Delaware Application July 18, 1931. Serial No. 551,598

9 Claims. (Cl. 308—35)

This invention relates to bearing supports for rotatable shafts and the like.

One object of the invention is the provision of a novel shaft bearing construction providing for effective transfer of great thrust forces, and also providing for substantially frictionless support of the shaft during the major portion of the cycle of rotational movement.

Another object of the invention is the provision of a bearing arrangement for rotatable shafts, in which plain or sliding friction bearings are employed to withstand unusual thrust loads, while normally and during the major portion of its revolution the shaft is supported by antifriction bearings, each bearing being adapted to transmit thrust forces from the shaft only in some definite general direction so that unusual thrust forces will not be exerted by the antifriction bearing.

A further object of the invention is the provision of a press having a rotatable crank shaft supported by plain and antifriction bearings so that during the time the press plunger is effective on the work the thrusts on the shaft are applied to plain bearings, relieving the antifriction bearings that normally support the shaft for substantially frictionless movement.

Other objects and advantages of the invention will be apparent from the following description, the appended claims and the accompanying drawing, in which—

Figures 1, 2, 3, 4:
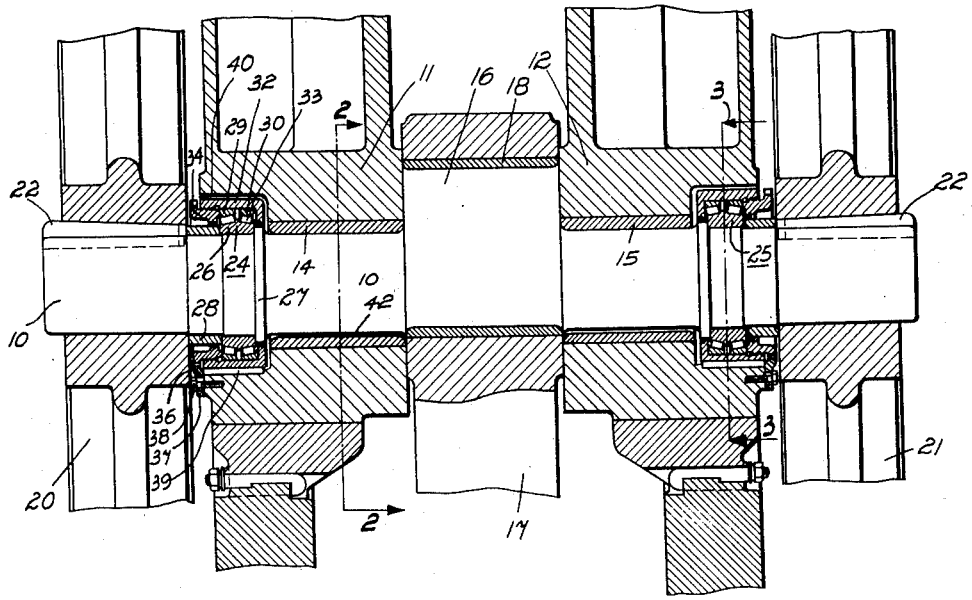
Fig. 1 is a sectional view taken longitudinally and centrally through a shaft having bearing supports embodying the present invention.
Fig. 2 is a section on the line 2—2 of Fig. 1.
Fig. 3 is a section on the line 3—3 of Fig. 1.
Fig. 4 is a front elevation on a much smaller scale, showing a press in which the crank shaft is supported in a manner illustrated in Figs. 1 to 3.

Referring to the drawing more particularly by reference numerals, 10 designates a rotatable shaft adapted for rotational movements in a frame or support such as the side frame portions 11 and 12. The particular kind of shaft to which the invention herein set forth is particularly adaptable is one in which unusual thrust loads are exerted at some particular point or position in the cycle of rotational movements. Such unusual thrust loads obtain, for example, in a stamping or drawing press in which the press plunger is operated by the shaft and is effective on the work to draw or stamp it during only a small fractional part of the complete 360° of revolution. During the time the plunger is effective on the work, there is a very great and temporary upward thrust on the crank or operating shaft, but during the remaining and comparatively large portion of the shaft movements, the weight of the parts acts downwardly on the crank shaft and the thrust loading to be transferred by the bearings is some normal value and very much smaller than the unusual or peak loads that obtain during the actual forming of the metal. In machines of this character ordinary plain bearings or bushings have been heretofore employed to support the shaft. Antifriction bearings do not satisfactorily withstand great thrust loads and the tremendous pressures and forces involved in a machine of this character. However, by a novel combination of plain and antifriction bearings to be herein described, a way has been found in which the unusual or peak thrust loads exerted by the shaft can be assumed by plain bearings, while antifriction bearings rotatably support the shaft during the remaining period of cycle of operations, the plain bearings being ineffective for the support of the shaft during the major portion of its rotational movement, and the antifriction bearings being so arranged that they cannot transmit any part of the unusual or peak thrust forces.

The invention will be herein described as applied to a press, for purposes of illustration, but it should be understood that the invention is susceptible to a great many other adaptations and uses and should not be limited merely to press construction.

With reference more particularly to Fig. 1, the frame portions 11 and 12 may be the opposite sides of the press frame. In each of these portions are fixed the two plain bearing bushings 14 and 15 which rotatably hold the shaft with sliding friction. Between the bushings 14 and 15 the shaft 10 is provided with an eccentric or crank portion 16. A crank arm 17 is operated upwardly and downwardly by means of the crank 16, a suitable bushing 18 being preferably provided between the crank and the arm 17. It will be understood that the arm 17 operates an upper die which is effective upon the metal or blank after the plunger is moved down a distance from its upper limit of movement depicted in Fig. 1.

On the outer ends of the shaft 10 are shown the two fly wheels 20 and 21 that are secured by keys 22 to the shaft ends. Power may be supplied to the shaft 10 by means of these wheels 20 and 21 so that the shaft 10 operates continuously, or if desired a suitable clutch device may be employed for operating the shaft 10 in any desired manner. Where the shaft 10 is continuously rotating, the arm 17 may be connected to the die carrying member through the intermediary of a gag arrangement or a suitable controllable connection so that the upper die can be moved or can remain stationary, as desired, while the shaft 10 continues rotating in a constant manner.

Adjacent the plain bearings provided by the bushings 14 and 15 there are antifriction bearings designated generally 24 and 25 which support the shaft with rolling friction. As similar constructions of bearing supports are employed at opposite ends of the shaft, only the antifriction bearing 24 and its association with the plain bearing will be described.

The antifriction bearing 24 comprises an inner race 26 that is held up against the flange 27 on the shaft by means of the collar 28. Outer race members 29 and 30 are fitted snugly in an outer race holder or ring 32, and between the outer and inner races there are series of rollers or other similar antifriction bearing members 33. As shown there are two series of rollers the axes of which are relatively inclined so that any play or looseness in the bearing can be readily taken up. In order to take up such looseness if it should develop, an adjusting collar 34 is provided, the collar being threaded into the outer end of the race ring 32. The collar 34 fits slidably on the outside of the collar 28, and the inner end of the collar 34 bears against the outer side of the ring 29. It will be apparent that by turning the adjusting collar 34, the outer race 29 may be moved over toward the race 30 and thus any play present in the bearing is taken up. To hold the collar 34 in its adjusted position a lock finger 36 on a lock arm 37 is engageable with teeth on the collar 34. The lock arm 37 may be secured by a bolt 38 or the like to the outer side of the supporting frame 11. By removing the bolt 38 and then moving the arm 37 the adjusting collar may be freely moved and when its proper position is attained it may be held in such position by again fixing the arm 37 in place.

The inner race 26 fits snugly on a cylindrical part of the shaft 10. The outer races 29 and 30 fit snugly within the race ring or holder 32. This holder instead of fitting snugly in the frame or support, is so arranged that it can move vertically in the recess 40 provided in the support adjacent the plain bearing or bushing 14. A key 39 prevents rotation of holder 32 but permits it to move up and down in the recess 40. As shown more particularly in Fig. 3 there is a substantial distance between the top of the recess 40 and the upper side of the race holder 32. In practice this distance may amount to one one-hundredth of an inch and may in fact be much greater. The lower side of the recess conforms to the cyclindrical shape of the race holder 32, but the arrangement is such that the entire holder can move up, maybe as much as ¼" if the shaft would permit it, in order that the load will not be taken by the antifriction bearing when force is exerted upwardly by the shaft on the frame. It is this upward force of the shaft that is extreme in amount and that is caused during the actual forming of the metal or blank, and since the entire antifriction bearing is not held against upward movement it will be quite clear that it will be impossible for any part of the upward thrust of the shaft to be assumed by the antifriction bearing. It must all be assumed by the plain bearing.

The plain bearing 14 is so arranged in the support as to be in surface contact with the upper side of the crank shaft and thus be capable of effectively transmitting the upward pressures exerted by the crank shaft. Thus the upward forces exerted when the die engages the work will be transmitted to the frame through the comparatively large surface contact given by the bushing 14, the antifriction bearing being relieved from all this load as previously described.

The lower side of the bearing 14 does not touch the underside of the shaft 10. The lower side of the bushing 14 is relieved so that there is about one one-hundredth of an inch or so of clearance as indicated at 42 between it and the shaft. Thus the shaft 10 could be bodily lowered for this distance of one one-hundredth of an inch were it not for the presence of the antifriction bearing which bears against the lower side of the recess 40 and thus holds the crank shaft up so that only an operating clearance is present between the shaft and the bearing.

The actual movement of the shaft 10 in a vertical direction therefore does not exceed one or two ten-thousandths of an inch or whatever the actual operating clearance may be and actually is less than this due to the oil film, both the antifriction and plain bearings being supplied with suitable lubricant through passages provided in the frame. The distance of one one-hundredth of an inch that has been referred to is a suitable figure for a shaft that is about 12" in diameter as it provides for substantial bearing wear before the shaft support becomes too loose for satisfactory operation. However, the amount of clearance provided between the shaft and the lower side of the plain bearing or between the outer race and the recess in the frame in which it is held may be far greater than the figure mentioned, inasmuch as this clearance is never taken up during actual operation.

It will now be apparent that the bearing arrangement is such that the unusually large peak loads or forces exerted during the stamping operation in an upward direction are assumed by the comparative large surface contact of the plain bearings, and during the time this load is effective on the shaft the antifriction bearings will be entirely relieved from all thrust loads as they cannot transmit upward forces from the shaft to the frame. During the remaining part of the shaft revolution, however, the shaft is rotatably supported in a substantially frictionless manner by means of the antifriction bearings, for during this remaining part of the cycle of movement the weights of the crank shaft and the crank arm are effective in a downward direction and these downward thrusts are all assumed by the antifriction bearings, the plain bearings being entirely ineffective under such conditions. This alternate transfer of the thrust loads from one bearing to the other provides a construction that permits of comparatively high rates of speed without overheating and provides for effective operation with great forces and over long periods of use, and furthermore provides an arrangement in which the bearings may be readily tightened up after they have become loosened or worn without tearing down the entire machine.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:
1. A shaft bearing construction comprising a shaft, a bearing for rotatably supporting said shaft with sliding friction, a second bearing for rotatably supporting said shaft with rolling friction, and means supporting said bearings so that one bearing is ineffective for thrust loads in one direction, while the other bearing is ineffective for thrust loads in a different direction.

2. A shaft bearing construction comprising a shaft, a bearing for said shaft, a second bearing for said shaft, and a support in which both bearings are mounted independently of one another so that one bearing is entirely ineffective for thrust loads laterally of the shaft axis in one direction while the other bearing is ineffective for thrust loads in a different direction.

3. A shaft bearing construction comprising, in combination, a support, a shaft, a plain bearing rotatably supporting said shaft with sliding friction and arranged in thrust transmitting relationship with the shaft and the support to assume the thrust loads in one general direction, but not in a second direction, and a second bearing for rotatably supporting the shaft with rolling friction and in thrust transmitting relationship with the support for assuming the thrust loads when they are in said second direction but relieved by the plain bearing when the thrust loads are in the said one general direction.

4. A shaft bearing of the character described comprising, in combination, a shaft, a support, a plain bearing in said support arranged for bearing contact with the shaft to transmit thrust forces in one direction transversely of the shaft but not in an opposite direction, and an antifriction bearing for the shaft, mounted in said support, and arranged to transmit thrust forces opposite to said one direction but not in the said one direction.

5. A shaft bearing of the character described comprising, in combination, a shaft, a support, a plain bearing in said support arranged for bearing contact with the shaft to transmit thrust forces in one direction transversely of the shaft but not in an opposite direction, and an antifriction bearing for the shaft, mounted in said support, including an outer race in thrust transmitting contact with the support only on one side of the race and arranged to be ineffective for the support of the shaft when the force on the shaft is in said one direction.

6. In combination, in a press, a press frame, a crank shaft, a plunger operated by said crank shaft, a plain bearing in said frame for said crank shaft for assuming the thrust of the shaft only when the plunger is in the effective operation on the work, and an antifriction bearing for said shaft for assuming only the normal loads of the shaft.

7. In combination, a support, a rotatable shaft subjected to unusual thrust loads in a definite direction transversely of the shaft at a definite point in its cycle of rotational movements, bearing for said shaft engaging on one side only with the shaft so as to assume all the unusual thrust loads in said definite direction, and an antifriction bearing for said shaft for supporting the shaft for frictionless rotation at points in the cycle of rotational movement of the shaft when the thrust loads are normal, the antifriction bearing having a movable part capable of movement in the support transversely of the shaft axis so as to render the antifriction bearing ineffective for supporting the shaft when the thrust loads are in said definite direction.

8. In a press, a crank shaft, a support, a plunger operating crank on said crank shaft, plain bearings for said crank shaft mounted in said support with a clearance greater than running clearance between the bottom of the shaft and the plain bearing, and antifriction bearings for said shaft provided adjacent said plain bearings and each comprising an outer race movably mounted in said support and held up by said support, the lowest position of the antifriction bearing as limited by said support being so coordinated with the shaft and the plain bearings that the antifriction bearings hold the shaft up against the upper side of the plain bearings but with operating clearance in the shaft bearings, so that the plain bearings assume the upward thrust on the crank shaft and entirely relieve the antifriction bearings when the thrust is upward.

9. In a device of the class described, a shaft, a support, plain bearings for said shaft in said support with a clearance greater than running clearance between the bottom of the shaft and the plain bearing, and antifriction bearings for said shaft provided adjacent said plain bearings and each comprising an outer race movably mounted in said support and held up by said support, an inner race on said shaft and antifriction members between said races, the lowest position of the outer race as limited by said support being so coordinated with the shaft and the plain bearings that the antifriction bearings hold the shaft up against the upper side of the plain bearings but with operating clearance in the shaft bearings, so that the plain bearings assume the upward thrust on the crank shaft and entirely relieve the antifriction bearings when the thrust is upward.

ARTHUR A. BYERLEIN.